US012711280B2

(12) United States Patent
Vorhies et al.

(10) Patent No.: US 12,711,280 B2
(45) Date of Patent: Aug. 18, 2026

(54) SYSTEM AND METHOD FOR SECURE AUTHENTICATION AND VERIFICATION OF DOCUMENT SIGNING SESSIONS USING A BIOMETRIC SMART PEN

(71) Applicant: Mastercard International Incorporated, Purchase, NY (US)

(72) Inventors: David Vorhies, Saint Charles, MO (US); Christopher T. Scholl, Manchester, MO (US); Shawn Mehrhoff, Sappington, MO (US)

(73) Assignee: Mastercard International Incorporated, Purchase, NY (US)

(*) Notice: Subject to any disclaimer, the term of this patent is extended or adjusted under 35 U.S.C. 154(b) by 49 days.

(21) Appl. No.: 19/009,001

(22) Filed: Jan. 3, 2025

(65) Prior Publication Data

US 2026/0195487 A1 Jul. 9, 2026

(51) Int. Cl.
*G06F 21/64* (2013.01)
*G06F 3/0354* (2013.01)
*G06F 21/32* (2013.01)

(52) U.S. Cl.
CPC .......... *G06F 21/64* (2013.01); *G06F 3/03542* (2013.01); *G06F 21/32* (2013.01)

(58) Field of Classification Search
CPC ....... G06F 21/64; G06F 3/03542; G06F 21/32
See application file for complete search history.

(56) References Cited

U.S. PATENT DOCUMENTS 6,828,960 B2 12/2004 Parry
6,970,583 B2 11/2005 Black
7,536,051 B2 5/2009 Lin et al.
7,609,862 B2 10/2009 Black
9,866,394 B2 1/2018 Alkhalaf
2006/0182343 A1* 8/2006 Lin .................... G06V 30/1423 382/181
2006/0215886 A1* 9/2006 Black ..................... G06V 40/30 382/124
2019/0197815 A1* 6/2019 Kamal ................ H04L 63/0861
2020/0322157 A1* 10/2020 Wease ................... H04L 9/3247
2024/0404323 A1* 12/2024 Cohen .................... G06V 10/82

* cited by examiner

*Primary Examiner* — Ayoub Alata
(74) *Attorney, Agent, or Firm* — Hovey Williams LLP

(57) ABSTRACT

Techniques are provided for secure authentication and recording of a document signing session using a smart pen device. The techniques include capturing biometric data of a user through a biometric sensor in the smart pen. The techniques also involve capturing real-time signing data through dual wide-angle cameras integrated into the pen. The signing data includes a first image of the signing environment and a second image of the item being signed. The data is compiled into a signing data package, which is encrypted and transmitted to an identity/document authenticator. The identity/document authenticator verifies and stores a cryptographic record of the signing session in a secure database and transmits a confirmation message to the smart pen device, indicating successful authentication and record storage. The techniques provide a secure, verifiable record of signing events, enhancing document authenticity and identity verification.

20 Claims, 7 Drawing Sheets

SYSTEM AND METHOD FOR SECURE AUTHENTICATION AND VERIFICATION OF DOCUMENT SIGNING SESSIONS USING A BIOMETRIC SMART PEN

BACKGROUND

The present invention relates generally to digital identity, and in particular, to systems and methods for secure authentication and recording of document signing sessions.

In various fields, such as finance, real estate, and legal services, the secure authentication and verification of document signing sessions are critical. Traditional methods often rely on physical notaries to witness, validate, and record signing events. However, notary-based processes have significant limitations, including logistical challenges and the potential for human error or fraud. A notary's physical presence is usually required, which can be inconvenient and time-consuming, especially in scenarios requiring swift authentication or in geographically dispersed transactions. Additionally, notarial acts are often difficult to verify retroactively, creating challenges in enforcing document authenticity.

Electronic methods of document signing and authentication have emerged in an attempt to address these issues, but they too face challenges related to data security, identity verification, and tamper resistance. Current electronic systems lack comprehensive measures to verify the authenticity of the signer's identity and the integrity of the signing environment.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a smart pen device is provided. The smart pen device includes a biometric sensor, first and second wide-angle cameras, a processor, and a memory. The memory stores executable instructions thereon, which when executed by the processor, cause the processor to capture biometric data of a user via the biometric sensor. The processor also captures real-time signing data during a signing session. The real-time signing data includes a first image, captured by the first wide-angle camera, of an environment in which the signing session is conducted; and a second image, captured by the second wide-angle camera, of an item being signed by the user using the smart pen device. The processor generates a signing data package including the real-time signing data, encrypts the signing data package, and transmits the encrypted signing data package to an identity/document authenticator. In addition, the processor receives a confirmation message from the identity/document authenticator. The confirmation message indicates successful generation and storage of a cryptographic record of the signing session in a secure database.

In another aspect, a computer-implemented method is provided. The method includes capturing biometric data of a user via a biometric sensor integrated into a smart pen device. The method also includes capturing real-time signing data during a signing session using a first wide-angle camera integrated into the smart pen device and a second wide-angle camera integrated into the smart pen device. The real-time signing data includes: a first image, captured by the first wide-angle camera, of an environment in which the signing session is conducted; and a second image, captured by the second wide-angle camera, of an item being signed by the user using the smart pen device. Furthermore, the method includes generating a signing data package including the real-time signing data, encrypting the signing data package, and transmitting the encrypted signing data package to an identity/document authenticator. Moreover, the method includes receiving a confirmation message from the identity/document authenticator. The confirmation message indicates successful generation and storage of a cryptographic record of the signing session in a secure database.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with an embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

Exemplary System

Figure 1:
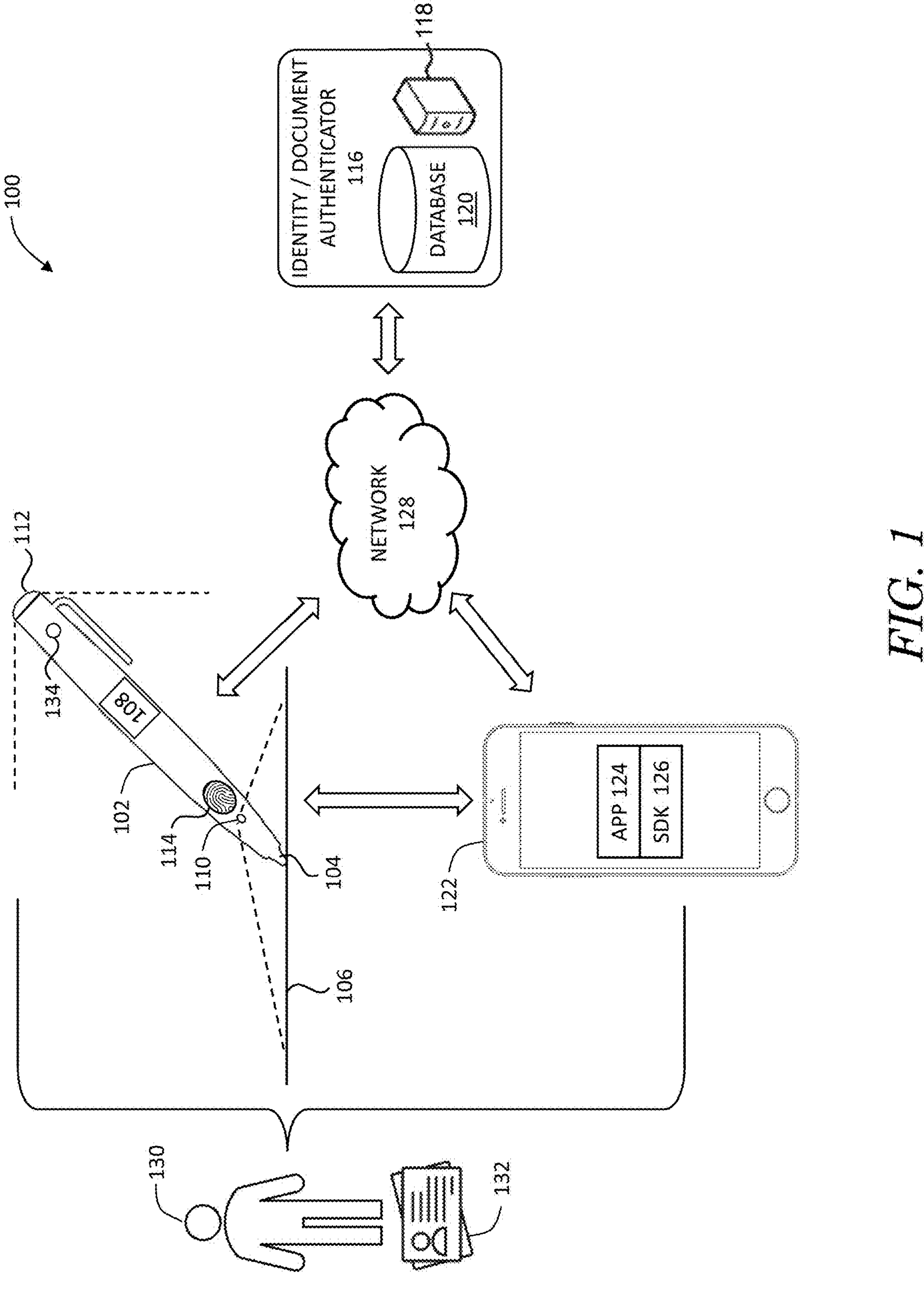
FIG. 1 depicts an exemplary system employing an electronic smart pen as an input device capable of capturing multi-modal data for signature authentication and digital identity purposes of a user.

FIG. 1 depicts an exemplary system 100 where an electronic smart pen 102 is employed as an input device capable of capturing multi-modal data for signature authentication and digital identity purposes of a user 130. Although the system 100 is depicted in one arrangement, other embodiments may include the elements of the system 100 (and/or other elements) arranged otherwise depending on, for example, relationships between users and identity/document authenticators, particular types of devices utilized with digital identities, privacy requirements, and the like.

Referring to FIG. 1, the system 100 may include the smart pen 102, a user computing device 122, and an identity/document authenticator 116. The identity/document authenticator 116 may include, and/or may be implemented in, a computing system, such as a computing system 118. The computing system 118 may include, for example, a desktop computer, a laptop or tablet computer, an application server, a database server, a file server, or the like, or combinations thereof, configured to execute or run one or more applications and/or provide one or more computing services. In addition, the computing system 118 may include and/or work in conjunction with application servers, database servers, file servers, gaming servers, mail servers, print servers, or the like, or combinations thereof. Furthermore, the computing system 118 may include a plurality of servers, virtual servers, or the like, or combinations thereof.

In the example, the smart pen 102, the user computing device 122, and the computing system 118 may be coupled to (and in communication with) one or more networks, such as a communication network 128. The communication network 128 may provide wired and/or wireless communication between the smart pen 102, user computing device 122 and the computing system 118. Each of the smart pen 102, the user computing device 122, and the computing system 118 may be configured to send data to and/or receive data from the communication network 128 using one or more suitable communication protocols, which may be the same communication protocols or different communication protocols as one another.

The communication network 128 may include one or more telecommunication networks, nodes, and/or links used to facilitate data exchanges between one or more devices and may facilitate a connection to the Internet for devices configured to communicate with communication network 128. The communication network 128 may include local area networks, metro area networks, wide area networks, cloud networks, the Internet, cellular networks, plain old telephone service (POTS) networks, and the like, or combinations thereof. The communication network 128 may be wired, wireless, or combinations thereof and may include components such as modems, gateways, switches, routers, hubs, access points, repeaters, towers, and the like.

The smart pen 102 may include an ink distributing component 104, enabling the smart pen 102 to function in a typical writing or marking capacity on a physical substrate 106, such as paper. Beyond traditional writing, the smart pen 102 incorporates an electronic processing system 108 configured to capture images, biometrics, and environmental data relevant to the authentication process. The electronic processing system 108 includes two wide-angle cameras 110, 112. One or more of the cameras 110, 112 include specific functionality to capture imagery across the substrate 106, user markings on the substrate 106, and/or the surrounding environment or setting.

In an exemplary embodiment, one or more of the wide-angle cameras 110, 112 is configured as a 360-degree camera capable of capturing omnidirectional imagery of the environment or setting. The 360-degree camera may consist of multiple cameras or a single camera with multiple lenses and sensors arranged to capture a complete 360-degree field of view around a central focal point. Such a configuration facilitates comprehensive data capture from all angles, including facial features of the user 130, facial features of any other individuals in the environment or setting, and other relevant contextual elements, thereby enhancing the authenticity and reliability of data transmitted for identity and document verification.

The smart pen 102 further includes a biometric input device 114, which in some embodiments is a fingerprint scanner. The biometric input device 114 is integrated into the smart pen 102 to capture and process biometric data, for example, unique to the user 130. The biometric data collected may include data from the user 130 and/or any other additional individuals present within the captured environment or setting, as required by the identity/document authentication process. The combined image and biometric data enable the smart pen 102 to provide a robust, multidimensional data stream suitable for secure authentication purposes, as discussed further herein.

In an embodiment, the user computing device 122 may be a mobile computing device, including a camera and a web browser. It is contemplated, however, that the user computing device 122 may be any device, such as a mobile phone, Smartphone, personal digital assistant (PDA), key fob, and/or a computer, such that the computing system 118 is accessible to the user computing device 122 using, for example, the network 128 (e.g., the Internet). The user computing device 122 may be interconnected to the Internet through one or more of many interface types including, for example, a network, such as a wireless network adapter or a wireless data transceiver for use with Bluetooth communication, radio frequency communication, near field communication (NFC), and/or with a mobile phone network, Global System for Mobile communications (GSM), 3G, 4G, 5G, or other mobile data network, and/or Worldwide Interoperability for Microwave Access (WiMax) and the like. The user computing device 122 may be any device capable of interconnecting to the Internet including an Internet connected phone, or any other suitable web-based connectable equipment.

The user computing device 122 may be associated with the user 130 and may include an identity/document authenticator (IDA App) 124. The IDA App 124 may be configured (via executable instructions) to interact with the smart pen 102 and the identity/document authenticator 116 in connection with requesting, providing, updating, etc. a digital identity of the user 130 and authenticating a writing (e.g., a signature) of the user 130. Specifically, in the exemplary embodiment, the IDA App 124 includes a software development kit (SDK) 126 associated with the identity/document authenticator 116. The SDK 126 may configure the user computing device 122 to interact with the identity/document authenticator 116. Furthermore, as described herein, the user computing device 122 is associated with the user 130 who, in turn, is associated with an identity.

The identity of the user 130 may be evidenced by one or more physical documents, such as a physical document 132. The physical document 132 may include, for example, a government issued license (e.g., issued by a state, regional, or federal government). It is contemplated, however, that the physical document 132 may include additional and/or other physical documents for the user 130, such as, for example, a health insurance card, a passport, a government issued identification document, a social security card, a bank statement, an employee ID, a library card, a utility bill, etc. The physical document 132 (and any other physical documents) includes one or more attributes of the user 130 and/or of the identity of the user 130. The one or more attributes distinguishes the user 130, alone or in combination, from one or more other users (not shown). The attributes may include, for example and without limitation, the user's name, mailing address, birthdate, contact information (e.g., a phone number, an email address, etc.), social security number or other government identification number, and/or any other desired attribute of the user 130.

In the example embodiment, the identity/document authenticator 116 of the system 100 may be associated with authenticating and/or providing a digital identity of the user 130 and authenticating a signature or writing made by the user 130. As depicted in FIG. 1, the identity/document authenticator 116 is shown as a standalone service and/or device of the system 100. It is contemplated, however, that the identity/document authenticator 116 may additionally, or alternatively, be incorporated in whole or in part with another party of the system 100, such as, for example, a payment network or a banking institution, etc. Specifically, for example, the identity/document authenticator 116 may be incorporated into the Mastercard® payment network and configured to operate as described herein to provide corresponding services to users via and/or in association with the Mastercard payment network. (Mastercard is a registered trademark of Mastercard International Incorporated). The Mastercard payment network is a set of proprietary communications standards promulgated by Mastercard International Incorporated for the exchange of financial transaction data and the settlement of funds between financial institutions that are members of Mastercard International Incorporated.

The identity/document authenticator 116 may be configured to interact with the user 130 to receive evidence of the identity of the user 130 to compile a digital identity for the user 130. The identity/document authenticator 116 may be configured to compile the digital identity for the user 130 after such evidence is received and after the user's identity is verified. The identity/document authenticator 116 may be configured to store the digital identity in a database, such as the database 120 associated with the identity/document authenticator 116. As such, the database 120 may include the user's digital identity and other digital identities for other users, and corresponding certification records therefor (together or separately). In some embodiments, the digital identities and the corresponding certification records may be stored in a block chain data structure, whereby the data structure may include a continually growing list of ordered records (where each record includes a time stamp and a reference or link to a prior record). Alternatively, the digital identities and the corresponding certification records may be stored in any other data structure or system, equivalent or not, that enables the system 100 to function as described herein.

The identity/document authenticator 116 may be further configured to provision the compiled digital identity for the user 130 to one or more computing devices, such as, for example, the user computing device 122. The digital identity may be provided by the user 130 (via the user computing device 122, etc.) to one or more relying parties when requested. In this manner, the one or more relying parties may be able to and may rely on the digital identity of the user 130 to satisfy, for example, proof of identity and/or know your customer (KYC) requirements, etc.

In the exemplary embodiment, the smart pen 102, the user computing device 122, and the computing system 118 may connect to the communication network 128 either through wires, such as electrical cables or fiber optic cables, or wirelessly, such as radio frequency (RF) communication using wireless standards such as cellular 3G, 4G, 5G, and the like, Institute of Electrical and Electronics Engineers (IEEE) 802.11 standards such as Wi-Fi, IEEE 802.16 standards such as WiMAX, Bluetooth™, or combinations thereof. In aspects in which the communication network 128 facilitates a connection to the Internet, data communications may take place over the communication network 128 via one or more suitable Internet communication protocols. For example, the communication network 128 may be implemented as a wireless telephony network (e.g., GSM, CDMA, LTE, etc.), a Wi-Fi network (e.g., via one or more IEEE 802.11 Standards), a WiMAX network, a Bluetooth network, etc.

Exemplary Computer Systems

Figure 2:
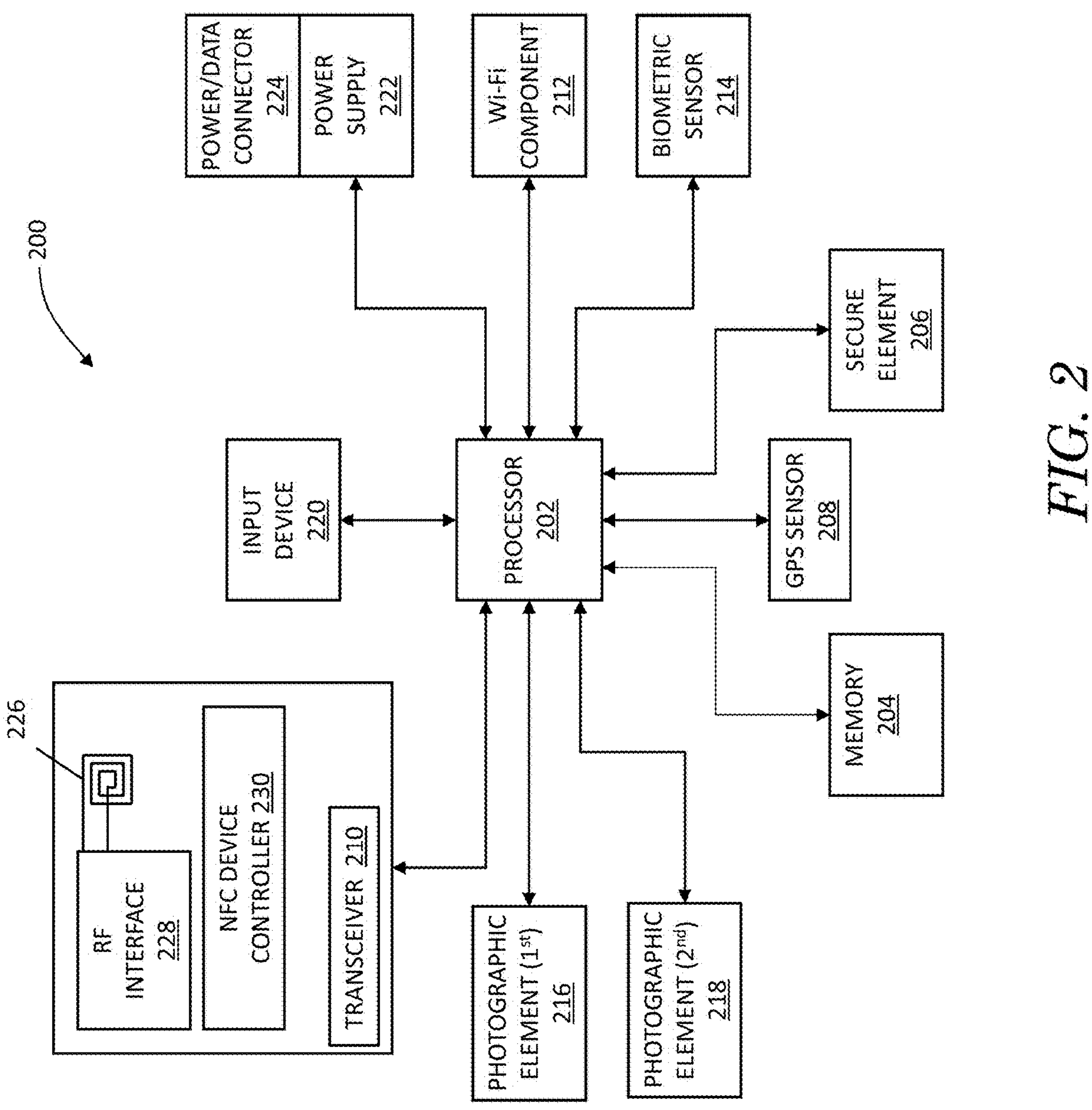
FIG. 2 is a block diagram illustrating an electronic processing system of the electronic smart pen shown in FIG. 1.

FIG. 2 is a block diagram illustrating an electronic processing system 200 of a pen-enabled computing device, such as the smart pen 102 (shown in FIG. 1). In the example, the electronic processing system 200 can be the electronic processing system 108 (shown in FIG. 1). The skilled person will understand that various elements of the electronic processing system 200 may be replaced by similar functional elements or may not be necessary in every embodiment.

In the exemplary embodiment, the electronic processing system 200 generally includes a processor 202, a memory device 204, a secure element 206, a GPS sensor 208, an NFC transceiver 210, and an integrated Wi-Fi component 212 (e.g., implementing the Institute of Electrical and Electronics/IEEE 802.11 family of standards). In addition, the electronic processing system 200 includes a biometric sensor 214, a first photographic element 216, and a second photographic element 218. The electronic processing system 200 also includes an input device 220, a power supply 222 (e.g., a battery or other self-contained power source) to receive power, and a power/data connector 224. The power/data connector 224 may include, for example, a USB connector configured to provide electrical power to the power supply 222 and/or transmit data between the processor 202 and an external computing device.

The processor 202 includes one or more processing units (e.g., in a multi-core configuration) specially programmed for executing computer readable instructions. The computer readable instructions may be executed within a variety of different operating systems (OS) on the electronic processing system 200, such as UNIX, LINUX, Microsoft Windows®, etc. More specifically, the instructions may cause various data manipulations on data stored in the memory device 204 (e.g., create, read, write, update, and delete procedures). It should also be appreciated that upon initiation of a computer-based method, various computer readable instructions may be executed during initialization. Some operations may be required to perform one or more processes described herein, while other operations may be more general and/or specific to a programming language (e.g., C, C#, C++, Java, or other suitable programming languages, etc.).

In the example embodiment, the processor 202 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the electronic processing system 200 may be widely deployed, it may be impractical to manually update software for each electronic processing system 200. Therefore, the system 100 provides a mechanism for automatically updating the software on the electronic processing system 200. For example, an updating mechanism may be used to automatically update any number of components and their drivers, both network and non-network components, including system level (OS) software components. In some embodiments, the components of the electronic processing system 200 are dynamically loadable and unloadable; thus, they may be replaced in operation without having to reboot the OS.

A location of electronic processing system 200 may be obtained through conventional methods, such as a location service (e.g., global positioning system (GPS) service) in the electronic processing system 200, "ping" data that includes geotemporal data, cell location register information held by a telecommunications provider to which the electronic processing system 200 may be connected, and the like. For example, in one suitable embodiment, a GPS sensor 208 may be part of or separate from the processor 202 to enable location determination of the electronic processing system 200.

The memory device 204 is configured to store data, such as computer executable instructions, for use by the electronic processing system 200 in performing the functions described herein. The memory device 204 is configured to store data using suitable data formatting methods and schema. The memory device 204 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program. In some instances, the memory device 204 is used to store encrypted biometric data and/or encrypted document authentication data.

In the exemplary embodiment, the secure element 206 is configured to securely store program code and data associated with one or more trusted applications. The secure element 206 is also configured to securely perform certain cryptographic operations, including deriving cryptographic keys based on master keys, encrypting data, and decrypting encrypted data. Furthermore, the secure element 206 is configured to store cryptographic tools (e.g., cryptographic keys, etc.) used to encrypt biometric data during the biometric registration process and to store one or more encrypted biometric templates. It is noted that, in embodiments of the disclosure, the secure element 206 is subject to heightened security protocols and practices, as will be apparent to persons skilled in the relevant art.

The Wi-Fi component 212 (broadly, a communication interface) is communicatively connectable to a remote computing device. The Wi-Fi component 212 includes, for example, a wireless or wired network adapter or a wireless data transceiver for use with Wi-Fi (e.g., implementing the Institute of Electrical and Electronics/IEEE 802.11 family of standards), Bluetooth communication, and/or with a mobile phone network, Global System for Mobile communications (GSM), 4G, 5G, or other mobile data network, and/or Worldwide Interoperability for Microwave Access (WiMax) and the like.

Stored in the memory device 204 are, for example, computer readable instructions for providing receiving and processing input from the input device 220. The input device 220 may include a user interface, such as a web browser, an application, and the like. Web browsers enable users to display and interact with media and other information typically embedded on a web page or a website. An application, for example, may allow a user to interact with the secure element 206, for example, when registering biometric data for user authentication and/or performing user and document signature authentication.

In the example embodiment, the biometric sensor 214 includes, for example, a fingerprint scanner configured to scan or read a user's fingerprint when a user's finger is placed on the fingerprint scanner. In this manner, a user can register (i.e., store) his or her fingerprint data on the smart pen 102 and/or with the identity/document authenticator 116 for subsequently authenticating the identity of the user. While a user's fingerprint is described herein in relation to biometric data, it is contemplated that the biometric sensor 214 can optionally include a camera, an optical imager, a retinal scanner, a microphone, a heart rate monitor, etc. Thus, the biometric data obtained via the biometric sensor 214 and used to generate the encrypted biometric data described herein, may include fingerprint data, facial feature data, retinal scan data, vein pattern data, heart rate data, etc. Thus, it is noted that the biometric data described herein are not limited to a particular biometric data type.

Each of the first and second photographic elements 216, 218 may include a camera or other optical sensor and lens combination capable of generating a video signal and capturing an image, iris scan, and the like. In various embodiments, the first and second photographic elements 216, 218 may be integrated in a housing or body, for example, of the smart pen 102. When the first and second photographic elements 216, 218 capture an image or otherwise generate image data (e.g., video data), the first and second photographic elements 216, 218 may store the image data in one or more data files, either in a raw or compressed format, in the memory device 204 and/or the secure element 206. In the example, the first photographic element 216 may include a wide-angle camera configured to capture at least a portion of a document (e.g., a portion of the substrate 106 shown in FIG. 1) and a user's written markings on the document. The second photographic element 218 may include a 360-degree camera configured to capture at least a portion of the environment or setting in which the smart pen is being used, including capturing facial features of the user and/or other persons in the environment or setting.

In an embodiment, the transceiver 210 includes an antenna 226. The antenna 226 includes a looped wire configured to transmit radio signals when current flows through the looped wire. The antenna 226 is any size, shape, and configuration that is suitable for transmitting signals as described herein. For example, the antenna 226 is a tuned circuit configured to transmit radio signals in any radio-based communication system including, but not limited to, Radio Frequency Identification (RFID) and near field communication (NFC) systems. In the example embodiment, the antenna 226 generates a magnetic field when it vibrates at a selected frequency. Specifically, the antenna 226 is configured to vibrate at a frequency of about 13.56 MHz, which is suitable for use in an NFC system.

In the example embodiment, the antenna 226 transmits radio signals to and receives radio signals from other wireless-enabled computing devices, for example, a user computing device and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 226 functions as an NFC component to send and receive signals. The antenna 226 is configured to transmit radio signals to NFC components positioned within the magnetic field of the antenna 226, such as when the electronic processing system 200 is positioned within a predetermined distance of a user computing device. Therefore, the magnetic field generated by the antenna 226 defines the active range of the electronic processing system 200. Additionally, the antenna 226 receives radio signals from NFC components when the antenna 226 is positioned within the magnetic field of the NFC components.

The transceiver 210 also includes a radio frequency (RF) interface 228 and an NFC device controller 230. The RF interface 228 and the NFC device controller 230 are powered by the power supply 222. In addition, the processor 202 and the memory device 204 are powered in the same manner. The RF interface 228 is configured to receive and transmit RF signals through the antenna 226. The NFC device controller 230 is configured to process the received RF signals and to generate signals to be transmitted by the RF interface 228. The memory device 204 is configured to store data associated with transmitting and receiving the RF signals. The NFC device controller 230 is coupled in communication with the processor 202.

In some embodiments, the electronic processing system 200 may be connected to one or more peripheral devices (not shown). That is, the electronic processing system 200 may communicate various data with one or more peripheral devices. For example, the electronic processing system 200 may communicate with one or more peripheral devices through the Wi-Fi component 212, the transceiver 210, or other suitable means.

Figure 3:
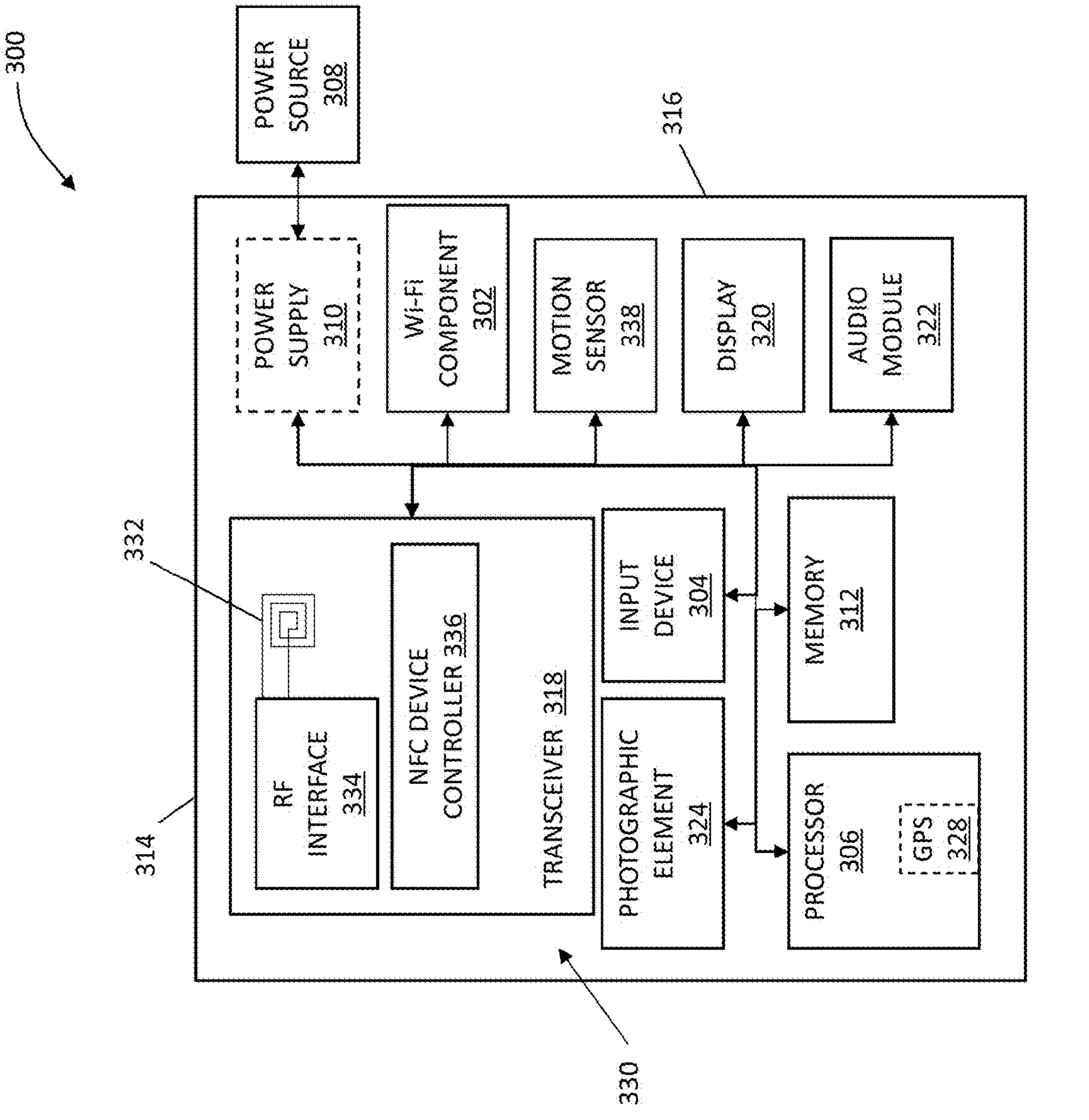
FIG. 3 is an example configuration of a user computing system of the system of FIG. 1.

FIG. 3 is an example configuration of a user computing system 300, such as the user computing device 122 (shown in FIG. 1) that may be operated by a user, such as the user 130 (shown in FIG. 1). In the exemplary embodiment, the computing system 300 may be a computing device configured to connect wirelessly to one or more of the smart pen 102, the identity/document authenticator 116, the network 128, and any other computing devices.

In the exemplary embodiment, the computing system 300 may include a processor 306, a memory device 312, a transceiver 318 (or a wireless communication device), and a photographic element 324. In addition, the computing system 300 may include an integrated Wi-Fi component 302 (e.g., implementing the Institute of Electrical and Electronics/IEEE 802.11 family of standards), an input device 304, a display 320, and an audio module 322. Moreover, the computing system 300 optionally may include an internal power supply 310 (e.g., a battery or other self-contained power source) to receive power, or alternatively, in some embodiments, the computing system 300 may include an external power source 308. Optionally, the computing system 300 may include a motion sensor 338.

The processor 306 may include one or more processing units (e.g., in a multi-core configuration) specially programmed for executing computer readable instructions. The instructions may be executed within a variety of different operating systems (OS) on the computing system 300, such as UNIX, LINUX, Microsoft Windows®, etc. More specifically, the instructions may cause various data manipulations on data stored in the memory device 312 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 312 may be any device allowing information such as transaction card data, the executable instructions, and/or other data to be stored and retrieved. The memory device 312 may include one or more computer readable media.

In the example embodiment, the processor 306 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 300 may be widely deployed, it may be impractical to manually update software for each computing system 300. Therefore, the system 100 may provide a mechanism for automatically updating the software on the computing system 300. For example, an updating mechanism may be used to automatically update any number of components and their drivers, both network and non-network components, including system level (OS) software components. In some embodiments, the components of the computing system 300 may be dynamically loadable and unloadable; thus, they may be replaced in operation without having to reboot the OS.

A location of the computing system 300 may be obtained through conventional methods, such as a location service (e.g., global positioning system (GPS) service) in the computing system 300, "ping" data that includes geotemporal data, cell location register information held by a telecommunications provider to which the computing system 300 may be connected, and the like. For example, in one suitable embodiment, an optional GPS chip 328 may be part of or separate from the processor 306 to enable location determination of the computing system 300.

The Wi-Fi component 302 (broadly, a communication interface) may be communicatively connectable to a remote device, such as the smart pen 102, the network 128, and/or the identity/document authenticator 116. The Wi-Fi component 302 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 312 may be, for example, computer readable instructions for providing a user interface to the user, such as the user 130, via the display 320 and, optionally, receiving and processing input from the input device 304. A user interface may include, among other possibilities, a web browser and a client application, such as the IDA App 124 (shown in FIG. 1), which may be hosted by the identity/document authenticator 116. Web browsers may enable users, such as the user 130, to view and interact with media and other information typically embedded on a web page or a website. A client application, such as the IDA App 124, may allow the user 130 to interact with a server application, for example, associated with the identity/document authenticator 116.

The photographic element 324 may include a camera or other optical sensor and lens combination capable of generating a video signal and capturing an image, iris scan, and the like. In various embodiments, the photographic element 324 may be integrated in a housing or body, such as a housing 314, of the computing system 300. When the photographic element 324 captures an image or otherwise generates image data (e.g., video data), the photographic element 324 may store the image data in a data file, either in a raw or compressed format, in the memory device 312.

In some embodiments, the motion sensor 338 may include one or more sensor elements that facilitate detecting a person's presence. For example, the motion sensor 338 may detect when the user 130 moves or raises the user consumer system 300. Upon detection of such motion, the photographic element 324 may begin capturing images (e.g., still or video images), the transceiver 318 may be activated, and/or the audio module 322 may begin capturing audio. The motion sensor 338 may be operatively coupled to the photographic element 324 such that the consumer's presence may be detected by detecting motion using the photographic element 324. The motion sensor 338 may include, for example, and without limitation, sensor elements such as a passive infrared sensor, an ambient light sensor, and the like.

In the example embodiment, the display 320 may include, for example, and without limitation, a liquid crystal display (LCD), an organic light emitting diode (OLED) display, or an "electronic ink" display. In some embodiments, a single component such as a touch screen may function as both an output device (e.g., the display 320) and the input device 304. As such, the display 320 may optionally include a touch controller for support of touch capability. In such embodiments, the computing system 300 may detect the presence of the user 130 by detecting that the user 130 has touched the display 320 of the computing system 300.

The audio module 322 may include, for example, and without limitation, a speaker and related components capable of broadcasting streaming and/or recorded audio and may also include a microphone. The microphone facilitates capturing audio through the computing system 300.

In the example embodiment, the computing system 300 includes the housing 314 at least partly (and more preferably, at least substantially or entirely) enclosing the components described above. In addition, the computing system 300 includes circuitry 330 configured to communicate with the network 128 (shown in FIG. 1) and/or other computing devices (e.g., other mobile devices, the computing system 118, etc.). The circuitry 330 may include, for example, leads, connectors, NFC-enabled circuitry, Wi-Fi-enabled circuitry, and photographic element circuitry. The housing 314 is preferably configured to seal the circuitry 330, which is susceptible to degradation from the ambient environment. In one embodiment, the circuitry 330 is hermetically sealed in the housing 314. For example, in one embodiment, the circuitry 330 is completely and permanently encased within the housing 314. In other words, the housing 314 and the circuitry 330 are intended to remain as a single, inseparable unit throughout the life of the computing system 300. It is understood that the housing 314 can be formed separately from the circuitry 330 and that the circuitry 330 can be placed into and sealed within the housing 314 in a separate operation. It is also understood that the housing 314 can be oversized with respect to the circuitry 330 so that the circuitry 330 can be placed loosely into the housing 314. In another embodiment, the circuitry 330 can be selectively, sealingly enclosed within the housing 314, where the housing 314 includes a closure 316 removably attached to a body of the housing 314.

The housing 314 may be fabricated from a suitably selected material that facilitates inhibiting the effect the material has on the signal being emitted from, for example, the transceiver 318 and/or the Wi-Fi component 302 and passed through the housing material. For example, and without limitation, suitable materials from which the housing 314 may be fabricated include polyethylene, propylene, isoprene, and butylenes (i.e., polyolefins). In other embodiments, the housing 314 may be fabricated from any material that enables the computing system 300 to function as described herein, such as metals, etc.

In one embodiment, the transceiver 318 may include an antenna 332. The antenna 332 includes a looped wire configured to transmit radio signals when current flows through the looped wire. The antenna 332 is any size, shape, and configuration that is suitable for transmitting signals as described herein. For example, the antenna 332 may be a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 332 generates a magnetic field when it vibrates at a selected frequency. Specifically, the antenna 332 may be configured to vibrate at a frequency of about 13.56 MHz, which is suitable for use in a near field communication (NFC) system.

In the example embodiment, the antenna 332 may transmit radio signals to and may receive radio signals from other wireless-enabled computing devices, for example, another mobile device, the smart pen 102, the computing system 118, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 332 may function as an NFC component to send and receive signals. The antenna 332 may be configured to transmit radio signals to NFC components positioned within the magnetic field of the antenna 332, such as when the computing system 300 is positioned within a predetermined distance of the smart pen 102. Therefore, the magnetic field generated by the antenna 332 may define the active range of the computing system 300. Additionally, the antenna 332 may receive radio signals from NFC components when the antenna 332 is positioned within the magnetic field of the NFC components.

The transceiver 318 also may include a radio frequency (RF) interface 334 and an NFC device controller 336. The RF interface 334 and the NFC device controller 336 may be powered by the power source 308, and in some embodiments, the internal power supply 310 and/or the display 320. In addition, the processor 306 and the memory device 312 may be powered in the same manner. The RF interface 334 may be configured to receive and transmit RF signals through the antenna 332. The NFC device controller 336 may be configured to process the received RF signals and to generate signals to be transmitted by the RF interface 334. The memory device 312 may be configured to store data associated with transmitting and receiving the RF signals. The NFC device controller 336 may be coupled in communication with the processor 306.

In some embodiments, the computing system 300 may be connected to one or more peripheral devices (not shown). That is, the computing system 300 may communicate various data with one or more peripheral devices. For example, the computing system 300 may communicate with one or more peripheral devices through the Wi-Fi component 302, the transceiver 318, or other suitable means.

Figure 4:
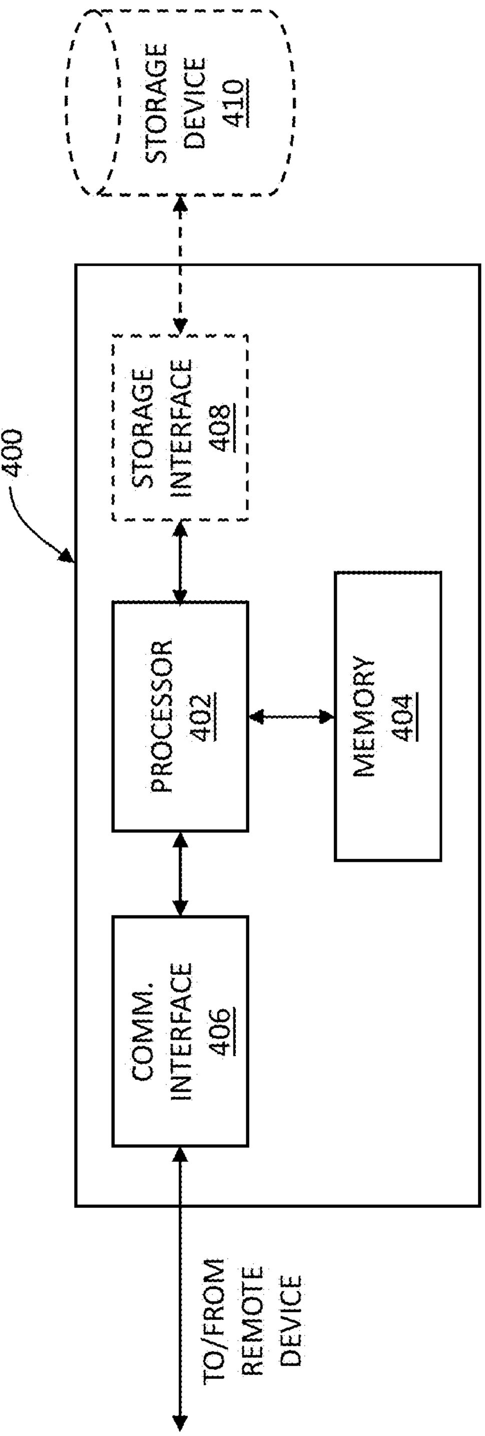
FIG. 4 is an example configuration of a server system of the system of FIG. 1.

FIG. 4 is an example configuration of a server system 400. In an embodiment, the server system 400 may include, but not be limited to, the computing system 118 (shown in FIG. 1). In the example embodiment, the server system 400 may include a processor 402 for executing instructions. The instructions may be stored in a memory 404, for example. The processor 402 may include one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 402 may be operatively coupled to a communication interface 406 such that the server system 400 can communicate with a remote device such as the smart pen 102 (shown in FIG. 1), a user computing system 300 (shown in FIG. 3), and/or another server system. For example, the communication interface 406 may receive communications from the smart pen 102 and/or the user computing device 122 via the Internet (each shown in FIG. 1).

The processor 402 may be operatively coupled to the storage device 410. The storage device 410 may be any computer-operated hardware suitable for storing and/or retrieving data. In some embodiments, the storage device 410 may be integrated in the server system 400. In other embodiments, the storage device 410 may be external to the server system 400. The storage device may be similar to the database 120 (shown in FIG. 1). For example, the server system 400 may include one or more hard disk drives as the storage device 410. In other embodiments, the storage device 410 may be external to the server system 400 and may be accessed by a plurality of server systems. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 may be operatively coupled to the storage device 410 via a storage interface 408. The storage interface 408 may be any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory 404 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Computer-Implemented Methods

Figure 5:
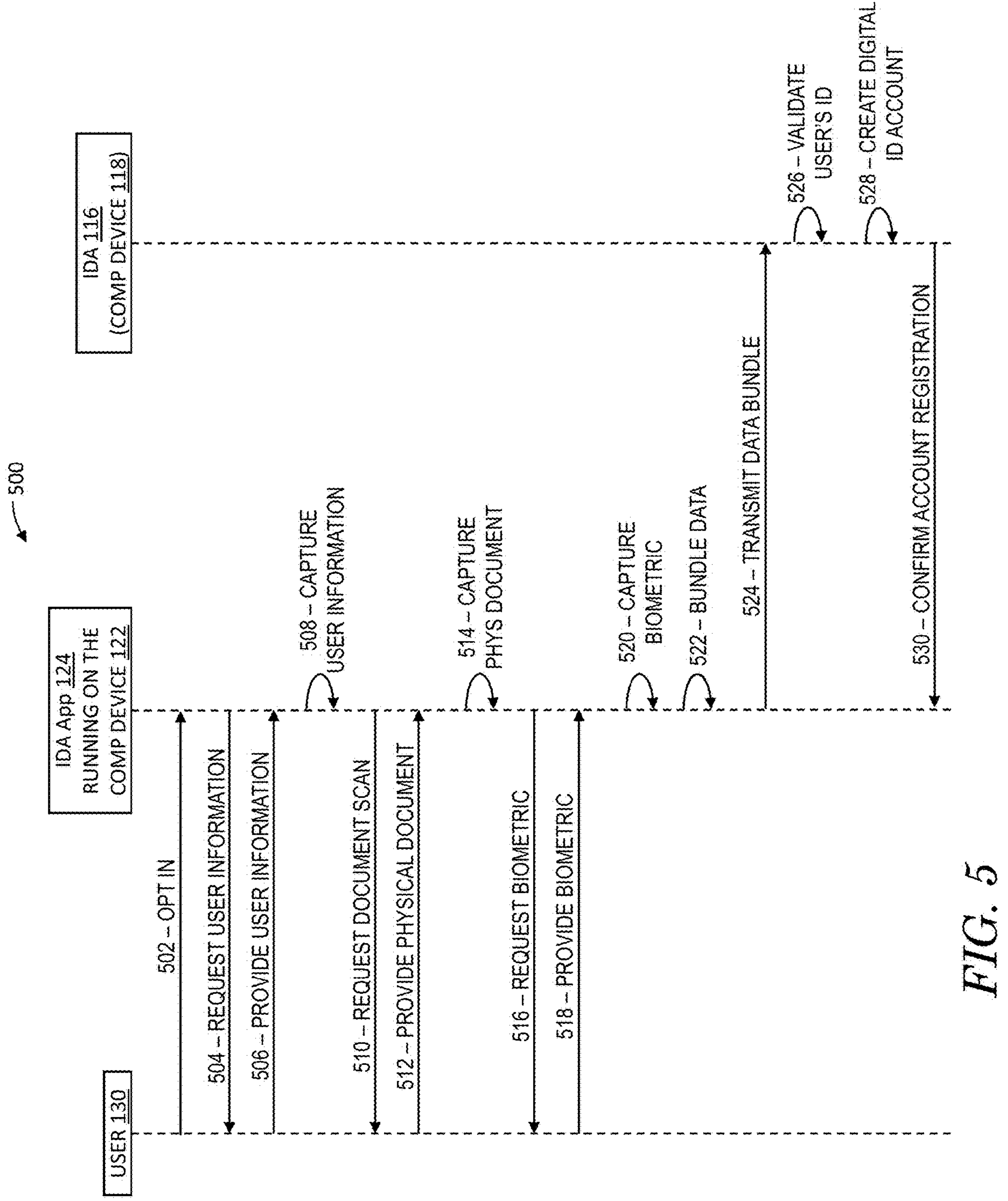
FIG. 5 depicts a flowchart illustrating an exemplary computer-implemented method for registering a digital identity, according to one aspect of the present invention.

FIG. 5 depicts a flowchart illustrating an exemplary computer-implemented method 500 for registering a digital identity, according to one aspect of the present invention. The operations described herein may be performed in the order shown in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-4. In one embodiment, the computer-implemented method 500 is implemented by the identity/document authenticator 116 (shown in FIG. 1) via the IDA App 124. While operations within the computer-implemented method 500 are described below regarding the identity/document authenticator 116, the computer-implemented method 500 may, according to some aspects of the present invention, be implemented using any other computing devices and/or systems of the system 100 through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, at operation 502, the user 130 opts into the provisioning of a digital identity by the identity/document authenticator 116 via input to the IDA App 124. For example, the user 130 may select an option to set up a digital identity via the IDA App 124 running on the user computing device 122. A digital identity includes personal identifying information (PII) of the user 130, which may be used by the identity/document authenticator 116 to positively identify the user 130.

After the user 130 opts into the provisioning of the digital identity, at operation 504, the user computing device 122 is configured, by the IDA App 124, to instruct the user 130 to provide user information for identification and to be associated with the account. The instruction may include a textual presentation on the display 320 of the user computing device 122. The user information requested may include, for example, the user's name, mailing address (e.g., a street, a city, a state and ZIP code, etc.), home phone number, work phone number, cell phone number, email address, and the like.

At 506, the user 130 provides the requested user information to the IDA App 124. For example, the user 130 may input the user information by pressing, typing, or tapping on an interface to the IDA App 124 on the user computing device 122. In some embodiments, the user 130 may provide a document that includes the user information and scan the document using the user computing device 122. The IDA App 124 may use a character recognition algorithm to decipher the scanned document.

At 508, the IDA App 124 captures the user information. The user information may be stored by the IDA App 124 in a memory of the user computing device 122, such as the memory 312 (shown in FIG. 3).

At 510, the user computing device 122 is configured, by the IDA App 124 via the SDK 126, to instruct the user 130 to scan an image of a physical document associated with the user 130, wherein the document includes user PII, such as the physical document 132 (shown in FIG. 1). The instruction may include a textual presentation on the display 320 of the user computing device 122.

At 512, the user 130 provides one or more document inputs associated with a physical document 132 to be captured by the IDA App 124, via the SDK 126. For example, the input may include pressing or tapping an icon indicating that a document is ready to be scanned by the user computing device 122. The physical document 132 may include, for example, the user's driver's license, a passport, another government ID, or other document containing PII). For example, and without limitation, regarding the PII provided by the physical document 132, the user 130 may provide a document that includes a name, a mailing address (e.g., a street, a city, a state and ZIP code, etc.), a home phone number, a work phone number, a cell phone number, an email address, government ID numbers (e.g., a driver's license number, a social security number, a passport number, etc.), a gender, a birthplace, a date of birth, a payment account credential, etc. (all, broadly, PII). It should be appreciated that additional PII may be requested by the identity/document authenticator 116 (via the IDA App 124 or SDK 126) from the user 130 in other embodiments (e.g., during registration, after initial registration, etc.).

In response to one or more document inputs from the user 130, at operation 514, the user computing device 122 is configured, by the IDA App 124 via the SDK 126, to capture an image of the physical document 132. Apart from the capture of the image, for example via the photographic element 324 of the user computing device 122 (shown in FIG. 4), it is contemplated that the user computing device 122 may be configured to otherwise interact with the physical document 132 (depending on the particular type of the physical document 132), such as, for example, through an NFC interaction with a security chip of the document 132 (e.g., such as a security chip of a passport document, etc.), whereby an image may then be generated for the document 132.

At operation 516, the user computing device 122 is configured, by the IDA App 124 via the SDK 126, to instruct the user 130 to provide a biometric, such as an image of the user 130 (e.g., a facial image, a selfie, etc.) or other biometric of the user 130 (e.g., an iris scan, a fingerprint, a palm print, etc.). The instruction may include a textual presentation on the display 320 of the user computing device 122.

At 518, the user 130 may provide his or her biometric to the user computing device 122 via an input to the IDA App 124. The input may include pressing or tapping an icon indicating that the user's biometric is ready to be captured or scanned by the user computing device 122.

At operation 520, the user computing device 122 is configured, by the IDA App 124 via the SDK 126, to capture the biometric of the user 130, such as an image of the user 130 (e.g., a facial image, a selfie, etc.) or other biometric of the user 130 and store the same as a template (e.g., a biometric template, etc.).

At operation 522, the IDA App 124 bundles the collected user information, document scan, and biometric template into a secure single data package. In an example, to securely bundle and transmit the sensitive PII of the user 130, the IDA App 124 may employ a multi-layered approach involving encryption, digital signing, and secure transmission protocols. For example, the IDA App 124 may encrypt the user information, document scan, and biometric template individually as distinct data elements, or encrypt the data together as a single data package. The IDA App 124 may use a strong encryption algorithm, such as AES-256 or another strong encryption algorithm. The IDA App 124 may generate a unique encryption key(s) for each data component or for the encrypted data package. In some embodiments, the key(s) are stored in the memory 312 of the user computing device 122, such as in a trusted execution environment (TEE) therein, or are derived temporarily from a user-specific attribute (such as a password) so they can be discarded after encryption, to thereby minimize exposure. The IDA App 124 may generate a hash (e.g., SHA-256) for the encrypted data package to ensure data integrity. The hash allows the computing system 118 of the identity/document authenticator 116 to confirm that the received data matches what was sent by the IDA App 124. The IDA App 124 may digitally sign the encrypted data package using a private key of the IDA App 124. The digital signature allows the computing system 118 of the identity/document authenticator 116 to authenticate the identity of the IDA App 124 using a corresponding public key.

At operation 524, the IDA App 124 transmits the secure data package to the identity/document authenticator 116, and more particularly, to the computing system 118 of the identity/document authenticator 116, for example, via the SDK 126. For example, in an embodiment, the IDA App 124 may initiate a secure session with the computing system 118 of the identity/document authenticator 116 using an encrypted communication protocol such as Transport Layer Security (TLS). During a handshake process, a session key is generated for encrypting data in transit, ensuring it remains confidential and tamper resistant. The IDA App 124 sends the bundled, encrypted, and signed data package over the secure TLS channel to the computing system 118 of the identity/document authenticator 116.

At operation 526, the computing system 118 of the identity/document authenticator 116 verifies and validates the identity of the user 130, the document 132, and the biometric (e.g., the facial image, iris scan, fingerprint, palm print, etc. of the user 130) provided by the user computing device 122. For example, the computing system 118 may verify the transmitted data using the public key of the IDA App 124 to authenticate the digital signature, and the received hash(es) may be checked against computed hash (es) of the decrypted data components to confirm integrity. The identity/document authenticator 116 may verify the information, for example, by comparing a facial image captured of the user 130 (e.g., subject to liveness detection, etc.) to the facial image included in an image of the physical document 132 captured by the user computing device 122. In some embodiments, the identity/document authenticator 116 may be configured to pass the image(s) (e.g., images(s) of the physical document 132 and facial image of the user 130) and/or the biometric template(s) of the user 130 to an identity verification provider, for example, associated with the document 132. An identity verification provider may include an entity that knows the identity of the user 130 (and other users), for example, based on records associated with the user 130. For example, an identity verification provider may include a government entity, such as a state department of motor vehicles (DMV), or a customs and border protection agency, either of which may possess a record(s) associated with the user 130. The record(s) associated with the user 130 may include a biometric associated with the user 130. For example, a DMV may have a record, identifiable by a driver's license number, which may include a facial image of each user and the associated driver's license issued by the DMV. It is contemplated that other entities, including, for example, financial institutions, utility providers, medical services entities, telecommunication providers, etc. (and more generally, any entity in possession of a biometric that may be verified to a particular user) may also be identity verification providers, with each potentially including different attributes of a user's identity. Thus, different identity verification providers may be alternatively contacted by the identity/document authenticator 116.

The identity verification provider may verify the identity of the user 130 and verify the biometric (e.g., the facial image, iris scan, fingerprint, palm print, etc. of the user 130) provided by the user computing device 122. In particular, where the identity verification provider is a department of motor vehicles (DMV), the identity verification provider may verify the image of the physical document 132 (i.e., the driver's license) against its records for the driver's license and/or to verify the facial image (e.g., a selfie, etc.) of the user 130 (or the biometric template therefor) against an image of the user 130 previously captured by the DMV, for example, when the driver's license was issued. It is contemplated that the same or similar identity verifications, by the identity verification provider(s), may be completed on other types of physical documents 132 and/or biometrics received from the user computing device 122. After the user 130 is verified, the identity verification provider may provide verification for the image(s) and the user 130 back to the identity/document authenticator 116.

At operation 528, the identity/document authenticator 116 may be configured to compile a digital identity (digital ID) account for the user 130 and may store the digital ID account, e.g., in the database 120. In this exemplary embodiment, the digital ID account may function as evidence of the identity of the user 130 and may include and/or bind the name of the user 130, contact information for the user 130, a device ID for the user computing device 122 (generally linking the user computing device 122 to the user's digital ID), the image of the physical document 132 (or template thereof), one or more attributes of the user's identity, and/or the captured biometric of the user 130 (as a biometric template), etc. It should be appreciated that in some embodiments, other suitable and/or desirable data may be included and/or bound within the digital ID account.

At operation 530, the identity/document authenticator 116 transmits confirmation of the digital ID account being completed and registered to the user computing device 122. At operation 532, the IDA App 124 may present a confirmation screen to the user 130, via the display of the user computing device 122, confirming registration of the digital ID account.

Figure 6:
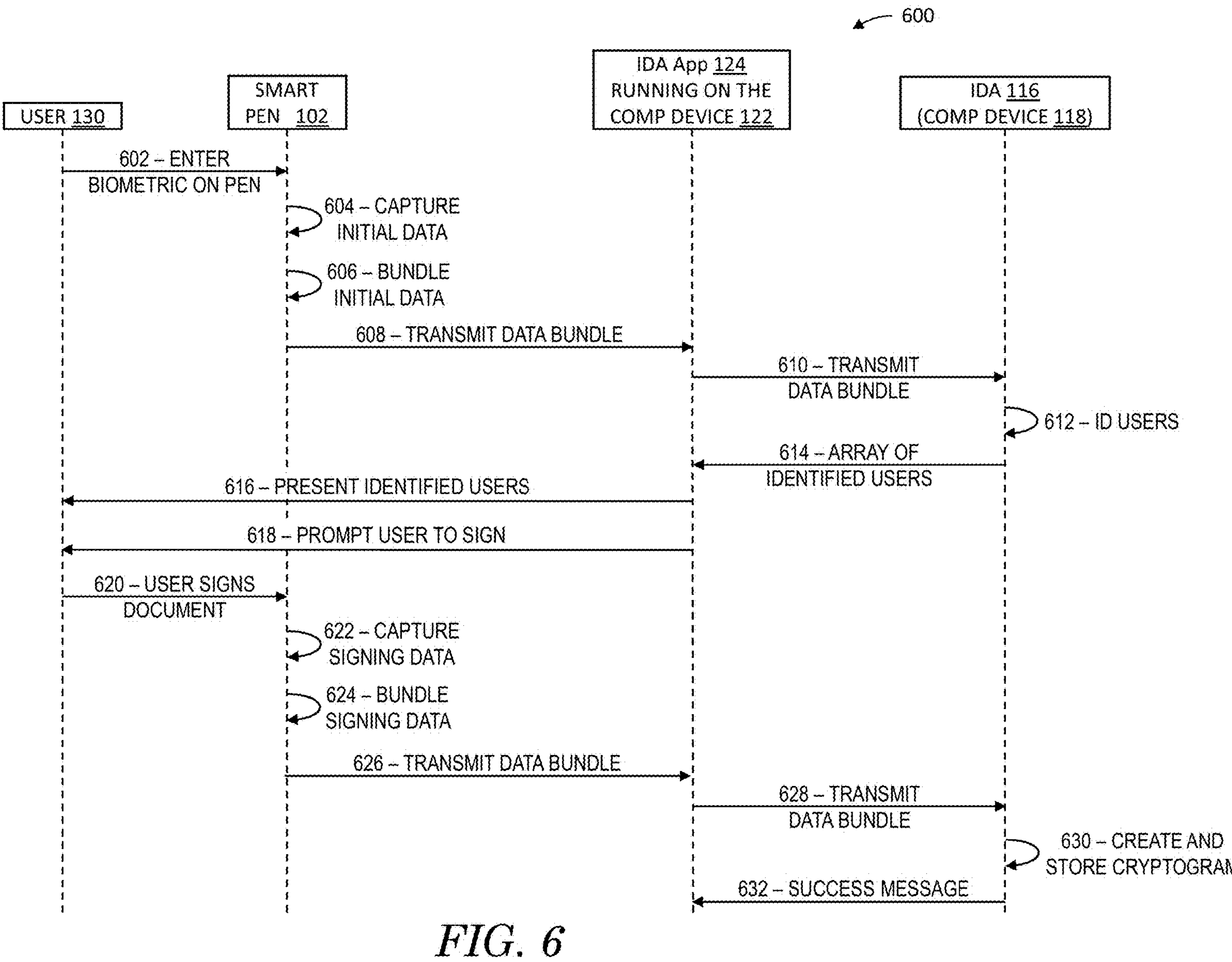
FIG. 6 depicts a flowchart illustrating an exemplary computer-implemented method for capturing the signing of a document and verifying the signer's identity, according to one aspect of the present invention.

FIG. 6 depicts a flowchart illustrating an exemplary computer-implemented method 600 for capturing the signing of a document and verifying the signer's identity, according to one aspect of the present invention. The operations described herein may be performed in the order shown in FIG. 6 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 600 is described below, for ease of reference, as being executed by exemplary devices and components introduced with the embodiments illustrated in FIGS. 1-4. In one embodiment, the computer-implemented method 600 is implemented by the smart pen 102 (shown in FIG. 1). While operations within the computer-implemented method 600 are described below regarding the smart pen 102, according to some aspects of the present invention, the computer-implemented method 600 may be implemented using any other computing devices and/or systems of the system 100 through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 602, the user 130 (also referred to as the "signer") of the smart pen 102 initiates a signing session by entering the user's biometric on the smart pen 102. For example, the user 130 may press the user's thumb on the biometric sensor 214 (shown in FIG. 2) integrated into the smart pen 102. The biometric sensor 214, such as a fingerprint scanner, may be activated when it detects the presence of the user's thumb. The smart pen 102 may have an indicator 134 (shown in FIG. 1), such as an LED light, or haptic feedback to signal that the biometric sensor 214 is ready for input. Upon pressing the user's thumb on the biometric sensor 214, the smart pen 102 may capture the signer's unique biometric data, which may include a fingerprint or other distinguishing physical characteristic. The biometric data serves as an initial verification step to verify the identity of the user 130 initiating the signing session.

At operation 604, the smart pen 102 captures initial data associated with the signing session. For example, the smart pen 102 may capture a wide-angle or 360-degree image of the environment or setting in which the signing session is being performed. Such an image may be captured by at least one of the two wide-angle cameras 110, 112 (shown in FIG. 1). The image may encompass the entire field of view surrounding the signer, i.e., the user 130. Concurrently, the smart pen 102 may also record and store the biometric data of signer, geolocation data of the smart pen 102 pinpointing the location of the signing session, and facial map data for each additional individual present in the field of view. The facial map data may facilitate identity verification of the additional individuals in the environment or setting. This data collection may be essential for regulatory compliance, auditing, and verification, providing context for the signing session.

At operation 606, the smart pen 102 bundles the collected initial data into a secure single data package. In an example, to securely bundle and transmit the initial data, the smart pen 102 may employ a multi-layered approach involving encryption, digital signing, and secure transmission protocols. For example, the smart pen 102 may encrypt the initial data as a single data package. The smart pen 102 may use a strong encryption algorithm, such as AES-256 or another strong encryption algorithm. The smart pen 102 may generate a unique encryption key(s) for each data component or for the encrypted data package. In some embodiments, the key(s) are stored in the secure element 206 (shown in FIG. 2) of the smart pen 102. The smart pen 102 may generate a hash (e.g., SHA-256) for the encrypted data package to ensure data integrity. The hash allows the computing system 118 of the identity/document authenticator 116 to confirm that the received data matches what was sent. The smart pen 102 may digitally sign the encrypted data package using a private key of the smart pen 102. The digital signature allows the computing system 118 of the identity/document authenticator 116 to authenticate the identity of the smart pen 102 using a corresponding public key.

At operation 608, the smart pen 102 transmits the secure data package to the IDA App 124. For example, in an embodiment, the smart pen 102 may transmit the data package via Bluetooth communication, radio frequency (RF) communication, near field communication (NFC), or other wireless technology. In addition, in some embodiments, the smart pen 102 may transmit the data package to the IDA App 124 by a wired connection via the power/data connector 224 (shown in FIG. 2) of the smart pen 102.

At operation 610, the IDA App 124 transmits the secure data package to the identity/document authenticator 116, and more particularly, to the computing system 118 of the identity/document authenticator 116, for example, via the SDK 126. In addition, the IDA App 124 queries the identity/document authenticator 116 using the captured facial map data contained in the data bundle to identify registered users matching the individuals captured in the environment or setting.

At operation 612, the identity/document authenticator 116 performs an analysis of the initial data to identify registered users within the captured environment using the facial map data collected by the smart pen 102. For example, after receiving the initial data from the companion app, the identity/document authenticator 116 may extract facial features from each person present in the environment using the facial map data. The identity/document authenticator 116 may compare each captured facial map with a database of registered users stored in the database 120 (shown in FIG. 1). The identity/document authenticator 116 may use one or more facial recognition algorithms that analyze facial landmarks, such as the distance between eyes or the shape of the jawline, and apply a confidence score to each match. Only matches with a confidence score above a predetermined threshold value are identified persons or individuals. The identity/document authenticator 116 may select relevant information from the database 120 associated with each match, such as a name, an identifier, and/or an image to facilitate visual confirmation.

The array or list of identified persons and the associated information may be prepared for transmission. In some embodiments, the array or list may include the captured images of the persons or individuals that were not identified by the identity/document authenticator 116.

At operation 614, the identity/document authenticator 116 transmits the array or list of identified persons and the associated information to the IDA App 124. The array or list may include including each person's name, confidence score, and image. In addition, in some embodiments, the array or list may include images of the unidentified individuals.

At operation 616, the IDA App 124 displays the array or list to the user 130, for example, on the display 320 of the user computing device 122. In some embodiments, the IDA App 124 may also prompt the user 130 to verify the identity of each person in the room. For example, the user 130 may select a check box for each correctly identified individual in the array or list. In addition, the user 130 may enter a name for each unidentified individual, for example, by typing the name next to the image of the individual using the input device 304 (shown in FIG. 3) of the user computing device 122. This process may facilitate ensuring all present individuals are identified and recorded for the signing session.

At operation 618, the IDA App 124 prompts the user 130 to sign the document or object. For example, the IDA App 124 may present the request to the user 130 on the display 320 of the user computing device 122. In response to the prompt, at operation 620, the user 130 begins signing the document or object using the smart pen 102.

At operation 622, during the signing, the smart pen 102 captures signing data by performing a real-time scan of the document or object using the two wide-angle cameras 110, 112. In addition, the smart pen 102 continuously captures the user's biometric data (e.g., fingerprint), updated geolocation data, and updated facial map data and/or images of each additional individual within the field of view.

At operation 624, the smart pen 102 bundles the collected signing data into a secure single data bundle. In an example, to securely bundle and transmit the signing data, the smart pen 102 may employ the same multi-layered approach described above in operation 606.

At operation 626, the smart pen 102 transmits the secure data bundle to the IDA App 124. For example, in an embodiment, the smart pen 102 may transmit the data bundle via Bluetooth communication, radio frequency (RF) communication, near field communication (NFC), or other wireless technology. In addition, in some embodiments, the smart pen 102 may transmit the data bundle to the IDA App 124 by a wired connection via the power/data connector 224 (shown in FIG. 2) of the smart pen 102. At operation 628, the IDA App 124 transmits the secure data bundle to the identity/document authenticator 116, and more particularly, to the computing system 118 of the identity/document authenticator 116, for example, via the SDK 126.

At operation 630, the identity/document authenticator 116 creates a cryptogram of the signing data and stores the cryptogram in the database 120. For example, after receiving the secure data bundle of the signing data, the identity/document authenticator 116 may decrypt the data bundle, verifying its integrity and checking for any signs of tampering, as described above. If the decryption process identifies inconsistencies or errors (e.g., corrupted data or failed integrity checks using the hash(es)), the identity/document authenticator 116 may flag the signing session for further review or prompt the IDA App 124 to reinitiate data capture and transmission. The identity/document authenticator 116 may parse the decrypted data, separating the data into individual elements, such as signature imagery or video, user biometrics (e.g., fingerprints or other biometrics captured during signing), environmental imagery (e.g., the additional individuals in the environment or setting), and geolocation metadata.

The identity/document authenticator 116 may generate a cryptographic hash of the decrypted and verified signing data. Using the hashed data, the identity/document authenticator 116 may create the cryptogram or a cryptographic signature. The cryptogram is an encrypted record of the signing session, embedding all relevant data such as the signature imagery, biometric data, environmental details, and geolocation metadata. The cryptogram may function as a tamper-proof record of the signing session, which can be decrypted and verified, if necessary, in the future. The identity/document authenticator 116 may store the cryptogram within a secure, access-controlled database managed by the identity/document authenticator 116, such as the database 120. The database 120 may be configured with one or more robust security protocols to protect the cryptogram from unauthorized access or modification.

In an embodiment, as part of the storage process, the identity/document authenticator 116 may log an audit trail entry associated with the cryptogram. The audit trail may include details such as a timestamp of storage, user identifiers, and session-specific metadata, providing an additional layer of traceability, as may be required for certain signing sessions.

At operation 632, after successfully generating and storing the cryptogram, the identity/document authenticator 116 transmits a confirmation message to the IDA App 124. The confirmation message may verify that the signing data has been securely processed, authenticated, and stored. The confirmation message may be presented to the user 130 on the display 320 of the user computing device 122.

Figure 7:
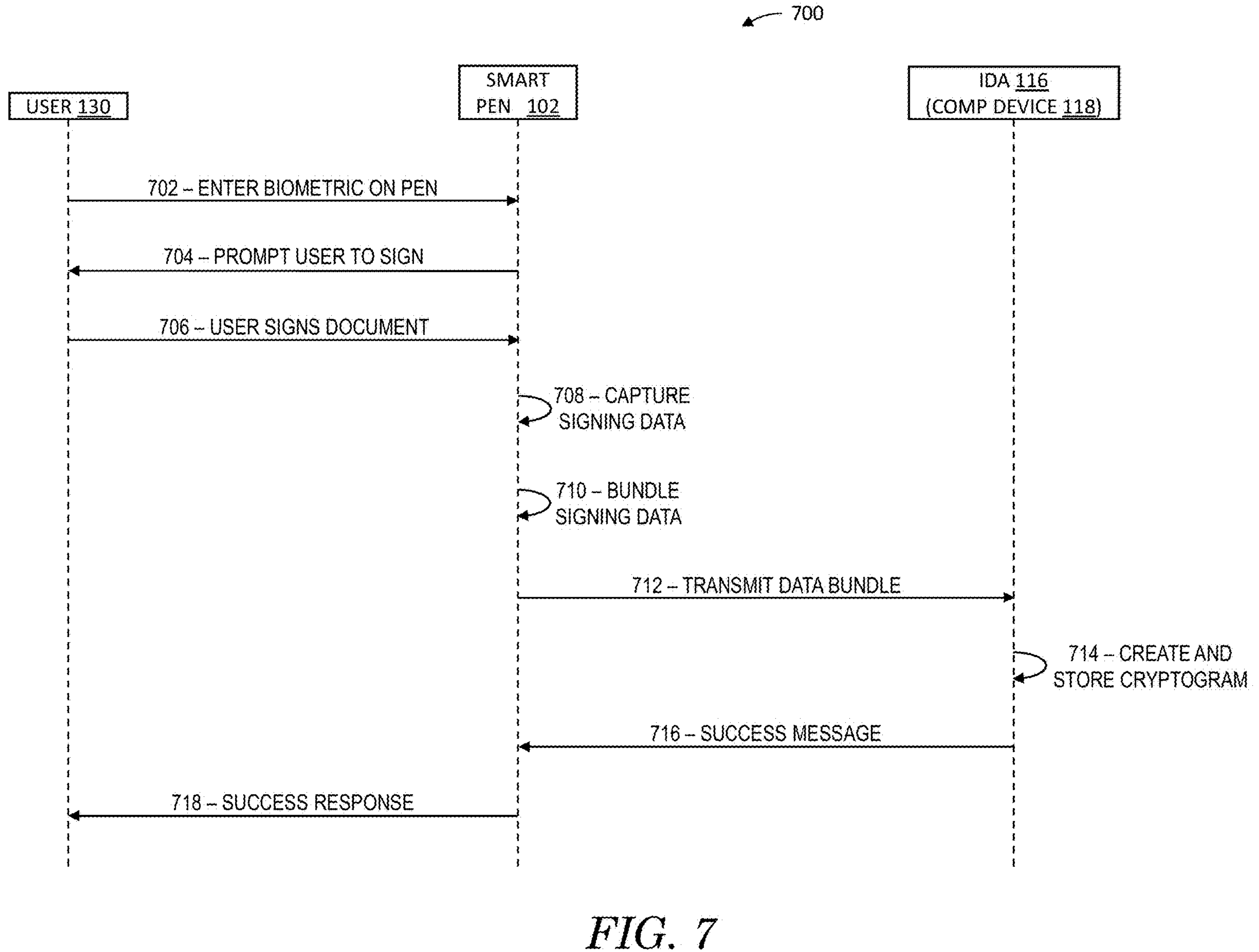
FIG. 7 depicts a flowchart illustrating another exemplary computer-implemented method for capturing the signing of a document and verifying the signer's identity, according to another aspect of the present invention.

FIG. 7 depicts a flowchart illustrating an exemplary computer-implemented method 700 for capturing the signing of a document and verifying the signer's identity, according to another aspect of the present invention. The operations described herein may be performed in the order shown in FIG. 7 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 700 is described below, for ease of reference, as being executed by exemplary devices and components introduced with the embodiments illustrated in FIGS. 1-4. In one embodiment, the computer-implemented method 700 is implemented by the smart pen 102 (shown in FIG. 1). While operations within the computer-implemented method 700 are described below regarding the smart pen 102, according to some aspects of the present invention, the computer-implemented method 700 may be implemented using any other computing devices and/or systems of the system 100 through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the embodiment depicted in FIG. 7, the smart pen 102 performs the signing session authentication and verification autonomously, without the need for the IDA App 124 or the user computing device 122.

The process begins at operation 702, where the user 130 initiates the signing session by pressing their thumb on the biometric sensor 214 embedded in the smart pen 102. The biometric sensor 214, such as a fingerprint scanner, captures the user's unique biometric data, providing initial identity verification. The smart pen 102 signals the user 130 with feedback, such as via an LED light or haptic response, to indicate successful biometric capture and session initiation.

After a successful biometric capture and feedback signal, at operation 704, the smart pen 102 signals the user 130 a second time to begin signing by providing additional feedback, such as an LED or haptic response. The user 130 begins signing the document at operation 706, with the smart pen 102 capturing real-time signing data throughout the process.

During the signing, at operation 708, the smart pen 102 continuously captures imagery or video of the signature and the user's additional biometric data (such as fingerprints during signing). The smart pen 102 also records the geolocation data along with facial map data and/or images of everyone within the field of view during signing. For example, using its wide-angle cameras 110, 112, the smart pen 102 takes an image of the environment, encompassing the entire field of view around the signer, and records the biometric data of the user 130, along with geolocation data pinpointing the signing location. Additionally, the smart pen 102 captures facial map data for each individual present within the field of view, supporting future identity verification. This data collection establishes context for regulatory compliance, auditing, and verification purposes.

At operation 710, the smart pen 102 securely bundles the signing data into an encrypted signing data package. Using the same multi-layered encryption and digital signing approach as described above in operation 606 (shown in FIG. 6), the smart pen 102 encrypts, hashes, and signs the signing data package to prepare it for secure transmission. The smart pen 102 transmits the signing data package directly to the identity/document authenticator 116 in operation 712, without any intermediary app or device, using the network 128.

Upon receiving the signing data package, the identity/document authenticator 116 decrypts the package at operation 714, verifies its integrity, and parses the data into its elements—signature imagery, user biometrics, environmental images, and geolocation metadata. A cryptographic hash is generated from the verified data, and the identity/document authenticator 116 creates a cryptographic record (cryptogram) embedding all relevant session information. This cryptogram serves as a tamper-proof record of the signing session, which can be securely stored in the database 120 managed by the identity/document authenticator 116.

At operation 716, after successfully generating and storing the cryptogram, the identity/document authenticator 116 sends a confirmation message directly to the smart pen 102, signaling the successful authentication, verification, and recording of the signing session. At operation 718, the smart pen 102 provides a final confirmation to the user 130, indicating that the session has been completed and securely stored. For example, such confirmation may be provided via additional feedback, such as an LED or haptic response. This alternative process allows the smart pen 102 and the identity/document authenticator 116 to directly handle all authentication, verification, and record-keeping tasks, eliminating the need for the IDA App 124 or user computing device 122.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The detailed description is to be construed as exemplary only and does not describe every embodiment because describing every embodiment would be impractical. Numerous alternative embodiments may be implemented, using either current technology or technology developed after the filing date of this application, which would still fall within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

The invention claimed is:

1. A smart pen device comprising:
a biometric sensor;
a first wide-angle camera;
a second wide-angle camera;
a processor; and
a memory storing executable instructions thereon, which when executed by the processor, cause the processor to:
capture biometric data of a user via the biometric sensor;
capture real-time signing data during a signing session, the real-time signing data including:
a first image, captured by the first wide-angle camera, of an environment in which the signing session is conducted; and
a second image, captured by the second wide-angle camera, of an item being signed by the user using the smart pen device;
generate a signing data package including the real-time signing data;
encrypt the signing data package;
transmit the encrypted signing data package to an identity/document authenticator;
receive a confirmation message from the identity/document authenticator, the confirmation message indicating successful generation and storage of a cryptographic record of the signing session in a secure database; and
in response to receiving the confirmation message, provide a confirmation signal to the user, by the smart pen device, via an LED light or haptic response.

2. The smart pen device in accordance with claim 1,
the biometric sensor comprising a fingerprint scanner,
the biometric data being used in an initial verification of an identity of the user,
the executable instructions further causing the processor to, as part of the initial verification, compare the biometric data to a previously stored biometric template associated with the user.

3. The smart pen device in accordance with claim 1,
the first wide-angle camera being configured to capture a 360-degree view of the environment.

4. The smart pen device in accordance with claim 1,
the executable instructions further causing the processor to digitally sign the encrypted signing data package using a private key.

5. The smart pen device in accordance with claim 1,
the executable instructions further causing the processor to:
capture initial data associated with the signing session via the first wide-angle camera, the initial data including a third image of the environment;
bundle the biometric data and the initial data into an initial data package;
encrypt the initial data package;
transmit the encrypted initial data package to the identity/document authenticator for verification; and
upon verification by the identity/document authenticator, receive an authorization signal to begin signing the item.

6. A computer-implemented method comprising:

capturing biometric data of a user via a biometric sensor integrated into a smart pen device;

capturing real-time signing data during a signing session using a first wide-angle camera integrated into the smart pen device and a second wide-angle camera integrated into the smart pen device, the real-time signing data including:

a first image, captured by the first wide-angle camera, of an environment in which the signing session is conducted; and a second image, captured by the second wide-angle camera, of an item being signed by the user using the smart pen device;

generating a signing data package including the real-time signing data;

encrypting the signing data package;

transmitting the encrypted signing data package to an identity/document authenticator;

receiving a confirmation message from the identity/document authenticator, the confirmation message indicating successful generation and storage of a cryptographic record of the signing session in a secure database; and in response to receiving the confirmation message, providing a confirmation signal to the user, by the smart pen device, via an LED light or haptic response.

7. The method in accordance with claim 6, the biometric sensor comprising a fingerprint scanner, the biometric data being used in an initial verification of an identity of the user, and as part of the initial verification, comparing the biometric data to a previously stored biometric template associated with the user.

8. The method in accordance with claim 6, further comprising:

providing first feedback to the user, by the smart pen device, via the LED light or haptic response, the first feedback indicating that the biometric sensor is ready to receive the biometric data.

9. The method in accordance with claim 8, further comprising:

providing second feedback to the user, by the smart pen device, via the LED light or haptic response, the second feedback indicative of successful biometric capture.

10. The method in accordance with claim 9, further comprising:

providing third feedback to the user, by the smart pen device, via the LED light or haptic response, the third feedback including a signal to the user to begin signing the item with the smart pen device.

11. The method in accordance with claim 6, the first wide-angle camera being configured to capture a 360-degree view of the environment.

12. The method in accordance with claim 6, the real-time signing data further including:

additional biometric data of the user;

geolocation data of the smart pen device; and facial map data of any individuals in the environment and within a field of view of the first wide-angle camera.

13. The method in accordance with claim 12, further comprising:

applying one or more facial recognition algorithms to compare the facial map data of individuals in the environment with a database of registered users.

14. The method in accordance with claim 6, further comprising:

generating a hash of the encrypted signing data package prior to transmission to ensure data integrity, wherein the generated hash is included in the transmission of the encrypted signing data package; and verifying the data integrity upon receipt of the encrypted signing data package by comparing the generated hash with a computed hash.

15. The method in accordance with claim 6, further comprising:

generating, by the identity/document authenticator, a cryptographic hash of the signing data; and storing the hash as part of the cryptographic record of the signing session.

16. The method in accordance with claim 6, further comprising:

digitally signing, by the smart pen device, the encrypted signing data package using a private key associated with the smart pen device, thereby generating a digital signature; and authenticating the digital signature at the identity/document authenticator using a corresponding public key.

17. The method in accordance with claim 6, further comprising:

storing, by identity/document authenticator, an audit trail entry associated with the cryptographic record, the audit trail entry including a timestamp, a user identifier, and metadata specific to the signing session.

18. The method in accordance with claim 6, further comprising:

storing the cryptographic record of the signing session in the secure database, the cryptographic record including the real-time signing data.

19. The method in accordance with claim 6, further comprising:

capturing initial data associated with the signing session via the first wide-angle camera, the initial data including a third image of the environment;

bundling the biometric data and the initial data into an initial data package;

encrypting the initial data package; and transmitting the encrypted initial data package to the identity/document authenticator for verification.

20. The method in accordance with claim 19, further comprising:

upon verification by the identity/document authenticator, receiving, by the smart pen device, an authorization signal to begin signing the item with the smart pen device.

* * * * *